United States Patent
Comerio (10) Patent No.: US 9,701,059 B2
(45) Date of Patent: Jul. 11, 2017

(54) PROCESS AND APPARATUS FOR REGISTERED EMBOSSING OF EXTENSIBLE PRINTED FILM OR OF A LAMINATE COMPRISING AN EXTENSIBLE PRINTED FILM

(71) Applicant: RODOLFO COMERIO SRL, Solbiate Olona (IT)

(72) Inventor: Carlo Comerio, Solbiate Olona (IT)

(73) Assignee: RODOLFO COMERIO SRL, Solbiate Olona (IT)

( * ) Notice: Subject to any disclaimer, the term of this patent is extended or adjusted under 35 U.S.C. 154(b) by 715 days.

(21) Appl. No.: 13/783,603

(22) Filed: Mar. 4, 2013

(65) Prior Publication Data

US 2013/0228946 A1    Sep. 5, 2013

(30) Foreign Application Priority Data

Mar. 5, 2012 (EP) ..................... 12158137

(51) Int. Cl.
*B29C 59/00* (2006.01)
*B29C 55/18* (2006.01)
(Continued)

(52) U.S. Cl.
CPC ............ *B29C 59/002* (2013.01); *B29C 55/18* (2013.01); *B32B 37/203* (2013.01); *B32B 38/06* (2013.01); *B29C 55/06* (2013.01); *B29C 55/065* (2013.01); *B29C 59/04* (2013.01); *B29C 59/046* (2013.01); *B32B 38/145* (2013.01); *B32B 38/1825* (2013.01); *B32B 2038/0028* (2013.01); *B32B 2309/72* (2013.01); *B32B 2471/00* (2013.01)

(58) Field of Classification Search
CPC ..... B29C 59/002; B29C 59/046; B29C 59/04; B29C 55/06; B29C 55/065
USPC ............ 264/40.7, 173.15, 210.7, 234, 288.4, 264/DIG. 73
See application file for complete search history.

(56) References Cited

U.S. PATENT DOCUMENTS 4,361,260 A    11/1982 Hanlan
4,408,974 A *  10/1983 Comerio ............... B29C 33/044
                                                264/288.4
(Continued)

FOREIGN PATENT DOCUMENTS

WO    WO 2009/143240    11/2009

OTHER PUBLICATIONS

European Search Report from European Application No. EP12158137 dated Jul. 16, 2012.

*Primary Examiner* — Alison L Hindenlang
*Assistant Examiner* — Lawrence D Hohenbrink, Jr.
(74) *Attorney, Agent, or Firm* — Dorsey & Whitney LLP (57) ABSTRACT

In an embodiment, a process for synchronized embossing of an extensible printed film or of a laminate product including an extensible printed film is disclosed. The process includes pre-heating the film; possible coupling of the pre-heated film with a substrate; passage of the film or of the laminate between an engraved embossing cylinder; and a pressing counter-cylinder, in which the extensible film is subjected to a controlled elongation, in the longitudinal direction only, during the pre-heating step, during which the film is in a thermoplastic state, and said controlled elongation is such as to synchronize the decoration printed on the film with the position of the embossing cylinder.

18 Claims, 4 Drawing Sheets

(51) Int. Cl.
*B32B 37/20* (2006.01)
*B32B 38/06* (2006.01)
*B29C 55/06* (2006.01)
*B29C 59/04* (2006.01)
*B32B 38/00* (2006.01)
*B32B 38/18* (2006.01)

(56) References Cited

U.S. PATENT DOCUMENTS

| | | | |
|---|---|---|---|
| 4,428,724 A * | 1/1984 | Levy | B29C 47/8855 264/210.1 |
| 4,612,074 A | 9/1986 | Smith et al. | |
| 6,183,671 B1 * | 2/2001 | Stauffacher | B29C 59/04 264/132 |
| 6,272,982 B1 | 8/2001 | Stauffacher et al. | |
| 6,416,607 B1 * | 7/2002 | Tsai | B32B 38/1833 156/209 |
| 7,887,722 B1 * | 2/2011 | Wu | B29C 59/046 156/229 |

* cited by examiner

PROCESS AND APPARATUS FOR REGISTERED EMBOSSING OF EXTENSIBLE PRINTED FILM OR OF A LAMINATE COMPRISING AN EXTENSIBLE PRINTED FILM

CROSS-REFERENCE TO RELATED APPLICATIONS

This application claims priority to European Application No. 12158137.5 filed on 5 Mar. 2012, the contents of which are incorporated herein, in their entirety, by this reference.

TECHNICAL FIELD

Embodiments of the invention concern the field of the production of printed films or laminates containing printed films. In particular, embodiments of the invention concern a technique of registered embossing (also known as synchronized embossing) with a design printed on extensible plastic film.

BACKGROUND

The progress of printing technology, including digital printing, has made it possible to make very high quality prints on films typically of PVC. A widely used application of high quality printing, obtainable with modern techniques, consists of imitation of natural materials like wood.

For example, it is known to make laminates made up of a substrate coated with the printed film that reproduces the appearance of a precious material and/or a natural material. One of the most common applications is represented by the production of plastic films for floors, imitating wood, known as "imitation wood" or "imitation parquet" or simply "parquet laminate". Other applications provide the use of printed films to add a touch of class to the surface of MDF panels and polylaminated plywoods for furniture surfaces, or coating of metal boards instead of painting, for the making of surfaces of household appliances and internal furnishing of boats.

Printing, albeit of high quality, is however not sufficient to give the product an acceptable appearance, because the film has a shiny and smooth surface which is absolutely unnatural. For example, it is possible to obtain a print that accurately reproduces the colours, the tones and the grains of any type of wood, but the product clearly remains perceptibly artificial due to the smooth and shiny surface.

In order to overcome this problem, it is known to use an embossing process. The embossing process generates a series of recesses on the surface of the film or laminate, creating irregularities that are perceptible to the touch, which allow the product to come much closer to the desired natural appearance.

A known technique applies the embossing in a continuous manner, substantially making the film or laminate pass between an engraved cylinder and an opposite pressing cylinder, also known as "offset cylinder" or counter-cylinder. This technique is quick, and substantially it can be implemented directly after the printing and the coupling between substrate and printed film. However, it is not satisfactory since the engraved cylinder generates an embossing with a pattern that is periodically repeated after every complete rotation of the cylinder, and that is not coordinated with the printing. For example, the distribution of the irregularities does not match with grains, knots or other special features of wood that are reproduced by the printing. Basically, the finished product remains clearly perceptible as artificial.

In order to avoid also this drawback, processes for registered embossing are known in which the irregularities produced by embossing are specifically coordinated with the printed decoration. As can be understood, the embossing member in this case is specific for a given decoration.

The process for registered embossing makes it possible to obtain a product that more realistically imitates a natural material (wood, stone, etc. . . . ), but it poses some technical difficulties. Indeed, it is necessary to ensure that the embossing is carried out strictly in a registered manner, so that the three-dimensional profile corresponds exactly with the print on the film. A possible misalignment or delay/anticipation of the engraved cylinder would render the whole process pointless creating a product with an unnatural and unsatisfactory appearance.

In the prior art, the registered embossing is carried out discontinuously. For example, a known technique for registered embossing a laminate comprises the following steps: the laminate is cut into panels of predetermined size, for example 2×4 meters; each panel is then conveyed individually to an embossing press; the panel is aligned on two axes, with respect to the plane of the embossing press and with the help of suitable references generated during printing; the press applies the desired relief (embossing) to the surface of the panel.

Production with discontinuous embossing does, however, prove to be slow and costly. The off-line embossing press, in particular, is expensive and bulky. A printed film or a laminate comprising a printed film, like the above mentioned "imitation parquet" laminates, are low-cost products and hence there is a need to simplify the process and make it as cheap as possible.

Due to the above, there is a need to operate the registered embossing of films or laminates continuously, i.e. directly on the sheet instead of on pre-cut panels.

Embodiments of the invention focus, in particular, on processes that use an extensible printed film, alone or in a laminate product comprising a support substrate coupled with the film. The term "extensible film" means a film that can undergo a substantial deformation. For example, films not reinforced with fibreglass are considered extensible, unlike reinforced films which are substantially inextensible.

The use of an extensible printed film poses a technical problem that up to now has not been solved and that has prevented the implementation of continuous synchronized embossing.

An extensible film, indeed, is subject to substantial changes in length that cannot be determined a priori, both during the printing process, and during storage or transportation before coupling and embossing. For example, the most common causes comprise:

- excessive traction (also called "pull") during the winding after the printing;
- the storage time and/or temperature, which may allow tensions to develop inside the material, generated during the steps prior to embossing;
- excessive traction and/or heating of the material during the unwinding, the possible coupling with a substrate and before embossing.

A consequence of an elongation of the extensible film is that the pattern itself is deformed. A particularly important consequence is the alteration of the distance between reference marks printed on the film. In fact, it is a known technique to generate, during printing, a series of reference marks (also known as notches or markings) that are spaced by a defined and constant distance, equal to the circumference of the printing cylinders. Upon optical reading, said reference marks act as a reference for registered printing. However, the deformation of the printed film, for example an elongation due to excessive pull and/or heating, inevitably alters the distance between said marks. It is thus clear that said marks cannot be of help in controlling a registered embossing process, being affected by an error that is not known a priori.

In other words, use of an extensible film makes even more complicated to maintain the match between embossing and printing, due to the deformability of the printing support (i.e. the film). For these reasons, continuous registered embossing has up to now been considered inapplicable to processes that involve an extensible film. However, systematically using an inextensible reinforced film involves problems of higher cost and therefore there is interest in attempting to extend synchronized continuous embossing also to extensible supports.

SUMMARY

The purpose of embodiments of the invention is to overcome the aforementioned drawbacks. More specifically, the purpose embodiments of the invention is to provide a technique for registered embossing particularly suitable for an extensible film or a laminate comprising an extensible film. The problem tackled by embodiments of the invention is that of effectively compensating for the deformations that typically affect an extensible film and that introduce a position error of the reference marks, making them substantially unusable.

Such a purpose is accomplished with an embodiment of a process for synchronized embossing of an extensible printed film or of a laminate product comprising an extensible printed film. Said extensible film is printed with a decoration having a pitch of repetition also known as printing pitch, and comprises a plurality of printed reference marks. The process comprises:
  the first step of pre-heating the printed film;
  an optional step of coupling the pre-heated printed film with a substrate, obtaining a laminate;
  embossing the film or the laminate thus obtained through the action of at least one engraved rotary embossing cylinder;
and it also comprises the operations of:
  acquiring a measurement correlated directly or indirectly to the angular position of said engraved cylinder, with respect to at least one reference mark of the film;
  subjecting said extensible film to a controlled elongation during the pre-heating step, the extent of said controlled elongation being determined as a function of said measurement, and such as to register the decoration printed on the film with respect to the angular position of said engraved embossing cylinder;
  said controlled elongation being obtained through the effect of a deformation of the film in a longitudinal direction of advance motion of the film itself, and said deformation of the film having a substantially null component in the transversal direction perpendicular to the longitudinal direction, so as to leave the width of said film unaltered, and also
  said embossing cylinder having an outer circumference of contact with said film or with said laminate that is greater than the printing pitch of the film.

Preferably, the acquisition of said measurement of the relative position between the printed film and the engraved cylinder comprises detecting the relative position between a reference mark printed on the film, and an impression generated and embossed on the film or on the laminate, respectively. For this purpose, the embossing cylinder comprises at least one impression generator.

Through the detection of a possible offset (also known as position error) between the printed mark and the impression, it is possible to determine the amount of a more or less correction that consists of a larger or smaller controlled elongation (stretching) of the film and/or of transversal centring. The controlled elongation is carried out in the pre-heating step, as will be explained in greater detail hereafter; the transversal centring can be carried out with a centring group, which is per se known, and which is located upstream of the pre-heating step.

In greater detail, a preferred embodiment of the invention provides to:
  detect the position of at least one reference mark printed on the film, carrying out said detection before the pre-heating process for the possible coupling and embossing, namely upstream of the controlled elongation step;
  detect an impression generated by the embossing cylinder;
  detect the position of a reference associated directly with said embossing cylinder.

The second step makes it possible to detect the result of the embossing of the engraved cylinder, and preferably comprises detecting the position of an embossing impression generated by said engraved cylinder relative to the position of the mark printed on said film. More preferably, said embossing impression is juxtaposed over said printed reference mark.

The position of said reference mark on the film and/or the position of said embossing impression and/or the position of said reference associated with the engraved cylinder are detected by means of optical reading or with another per se known technique.

It should be noted that the invention provides subjecting the extensible film to a deformation of pure elongation (or stretching) in the longitudinal direction with no transversal component, i.e. preserving the width of the film. Such a provision avoids a transversal narrowing of the material, which would cause a loss of synchronization of the printed decoration with respect to the engraved cylinder, in particular at the sides of the film. The term longitudinal direction in this description denotes the direction of transportation or advance motion of the film.

In order to obtain just a deformation of pure elongation, advantageously, the film passes through a series of cylinders (or groups of cylinders) having a small diameter, not greater than 200 mm and more preferably about 150 mm, with progressive increase in the transportation speed of the film and consequent longitudinal stretching effect. The passage between cylinders of small diameter and increasing speed makes it possible to obtain a longitudinal stretching substantially without necking in the transversal direction, because the film remains perfectly adherent to the small diameter cylinders, without sliding on them.

According to another feature of one or more embodiments of the invention, the elongation takes place in the small space between cylinders that are close together, namely in the absence of substantial rectilinear transportation sections between one cylinder and the other. Indeed, the applicant has found that the extensible film can undergo undesired transversal shrinkage when it is left free and not blocked on the cylinders. For this reason the controlled elongation advantageously takes place between cylinders that are immediately close together.

The step of coupling the pre-heated film with a substrate is optional. Indeed, the invention is equally applicable to processes for making:
- a printed and embossed film, typically used as material for coatings, or:
- a laminate comprising a substrate and a printed film, typically used as material for floors.

In the first case the extensible film, after pre-heating, passes directly to the embossing step. The end product is represented by the extensible film that has been printed and embossed in register. In the second case the extensible film, after the controlled elongation in pre-heating step, is coupled with a substrate; the so obtained laminate, which is no longer extensible and modifiable, passes to the subsequent embossing step.

The substrate can be formed for example from one or more layers of recovered material or from a layer of fibreglass. It should be noted that, in any case, the controlled elongation of the printed film is managed in the pre-heating step and before the possible coupling with a substrate. Indeed, the substrate stiffens the laminate product, especially being reinforced, making it substantially inextensible. Moreover, due to the substantial inextensibility of the laminate, the registering of the printed decoration relative to the coupling cylinder also ensures that the decoration is registered with the embossing cylinder situated downstream.

In some embodiments, the embossing can be carried out at the same time as the coupling, i.e. the same pair of cylinders can carry out coupling and embossing, even if it is preferred to carry out the two steps separately with a first pair of cylinders for coupling with the substrate, and a second pair of cylinders for embossing the so obtained laminate.

In some embodiments, moreover, the coupling between film and substrate can be carried out by a cylinder that represents the last cylinder of the series of pre-heating cylinders. In said embodiments, in practice, the coupling station is integrated with the pre-heating section.

The material of the extensible film is preferably PVC.

Embodiments of invention exploit the property of extensibility of the film to compensate for the deformations caused by printing, storage, etc., by actuating a controlled elongation in the longitudinal direction and avoiding a loss of width in the transversal direction. Embodiments of invention carry out, on an extensible film, an elongation during the pre-heating step, due to the state of plasticity because of high temperature (typically about 150° C.) and due to the traction stresses, generated by the passage of the film between a series of pre-heating cylinders. Embodiments of invention disclose controlling said elongation in the longitudinal direction, without modifying the width of the film, to bring the distance between the marks back to a known and constant value and, therefore, to adapt the printed pattern to the development of the engraved cylinder. It is thus possible to synchronize the embossing process with the pattern itself. In other words, the invention adopts a controlled stretching of an extensible film, before the embossing step (or possibly before the step of coupling with a substrate), to compensate for the unknown and unpredictable elongations which inevitably affect an extensible film.

One of the features of one or more embodiments of the invention is the fact of elongating the extensible film in thermoplastic phase (i.e. during pre-heating, in which the film is indeed in a thermoplastic state) in such a way that the distance between two contiguous marks is made exactly equal to the circumference of the engraved cylinder.

The decoration printed on the film repeats according to a printing pitch that is determined by the diameter (that is the circumference) of the printing cylinder (or cylinders). In the same way, the embossing follows an embossing pitch that is determined by the diameter of the engraved cylinder.

According to one of the aspects of one or more embodiments of the invention, the embossing cylinder has an outer circumference of contact with the film, or with the laminate, that is greater than the printing pitch (also known as "development" of the decoration). It is suitable for said difference to be such as to ensure that the circumference of the process cylinder is greater than the development also on the possibly deformed film entering the preheating section, to ensure that the error can be recovered with the controlled elongation as described above. It has been noted that advantageously the difference between outer circumference of the engraved cylinder or embossing pitch is at least 7% of the circumference of the printing cylinder or printing pitch.

By managing the controlled elongation, that is by increasing more or less the elongation through the pre-heating step, it is possible to take the distance between the aforementioned reference marks back to the desired constant value. In other words, it can be said that a controlled stretching of the film (and the printed decoration as well) is added to the deformation previously undergone for uncontrollable causes, and puts the decoration back in synchrony with the engraved cylinder. In summary, the controlled stretching restores the desired synchrony between printing and embossing.

The controlled elongation of the film, during the pre-heating step, can be managed with suitable variations of drag speed and/or temperature of the film. Preferably, the pre-heating step comprises the passage of the film between a plurality of pre-heating cylinders, or groups of pre-heating cylinders, having different speeds and/or temperatures.

More preferably, said pre-heating cylinders (or groups of cylinders) can be controlled with independent rotation speeds, and the extent of said controlled elongation is determined by applying different speeds to at least two of said cylinders or groups. Another factor for controlling the elongation of the film is the regulation of the temperatures of the cylinders to suitable values.

The speed and/or temperature of the cylinders or of the groups of cylinders are continuously determined as a function of the measurement of relative position between the decoration and the embossing cylinder, so as to control the elongation (stretching) of the film during the passage in the pre-heating section, and obtain the desired registering effect of the printed decoration with the exact position of the engraved cylinder. Preferably, the temperature of the pre-heating cylinders increases from the inlet to the outlet of the pre-heating section, to reach the ideal stretching temperature in plastic phase in the area where the cylinders increase the speed of the film.

The groups of cylinders can be represented by pairs of cylinders. For example, the invention can be made with a pre-heating section comprising at least one pair of cylinders having peripheral speed equal to the speed of the incoming film entering the pre-heating section, and a second pair of cylinders with a higher peripheral speed, so that the film undergoes a stretching and elongation by means of the acceleration while passing from the first to the second pair of cylinders, when the film has reached the suitable temperature.

The embossing process can be carried out with a substantially constant pressure and without intervening on the motion of the engraved cylinder, since the registering is ensured by the described controlled elongation of the film during the pre-heating. The embossing pressure can be generated by a hydraulic system that presses a pressing counter-cylinder towards the engraved cylinder. In a particularly preferred embodiment, said hydraulic system comprises a double-acting hydraulic cylinder, with a piston that acts on the counter-cylinder. The thrusting pressure is the resultant of the difference between the pressure existing in the two chambers of the double-acting cylinder.

An aspect of one or more embodiments of the invention also consists of an apparatus for embossing an extensible printed film or a laminate according to the attached claims.

The substantial advantage one or more embodiments of the invention is that it makes it possible to apply continuous registered embossing to laminates with extensible film. Up to now such application was not considered feasible precisely due to the characteristics of extensibility of the printing support. An advantage of the invention is the ability to self-adaptation and correction thanks to the fact that the detection of a mark on the film can be continuously compared with the detection of position of the engraved cylinder and/or of an embossing impression. Another advantage of one or more embodiments of the invention is that it does not require modifications to the embossing section since the registering adjustment is carried outer upstream. It must be noted that embodiments of the invention make it possible to use the printed marks on the film, since now used as reference only for printing, also for the subsequent step of registered embossing, thanks to the registering effect.

The advantages of the various embodiments of the invention will become more clear with the help of the following description, referring to a preferred embodiment.

DETAILED DESCRIPTION

Figure 1:
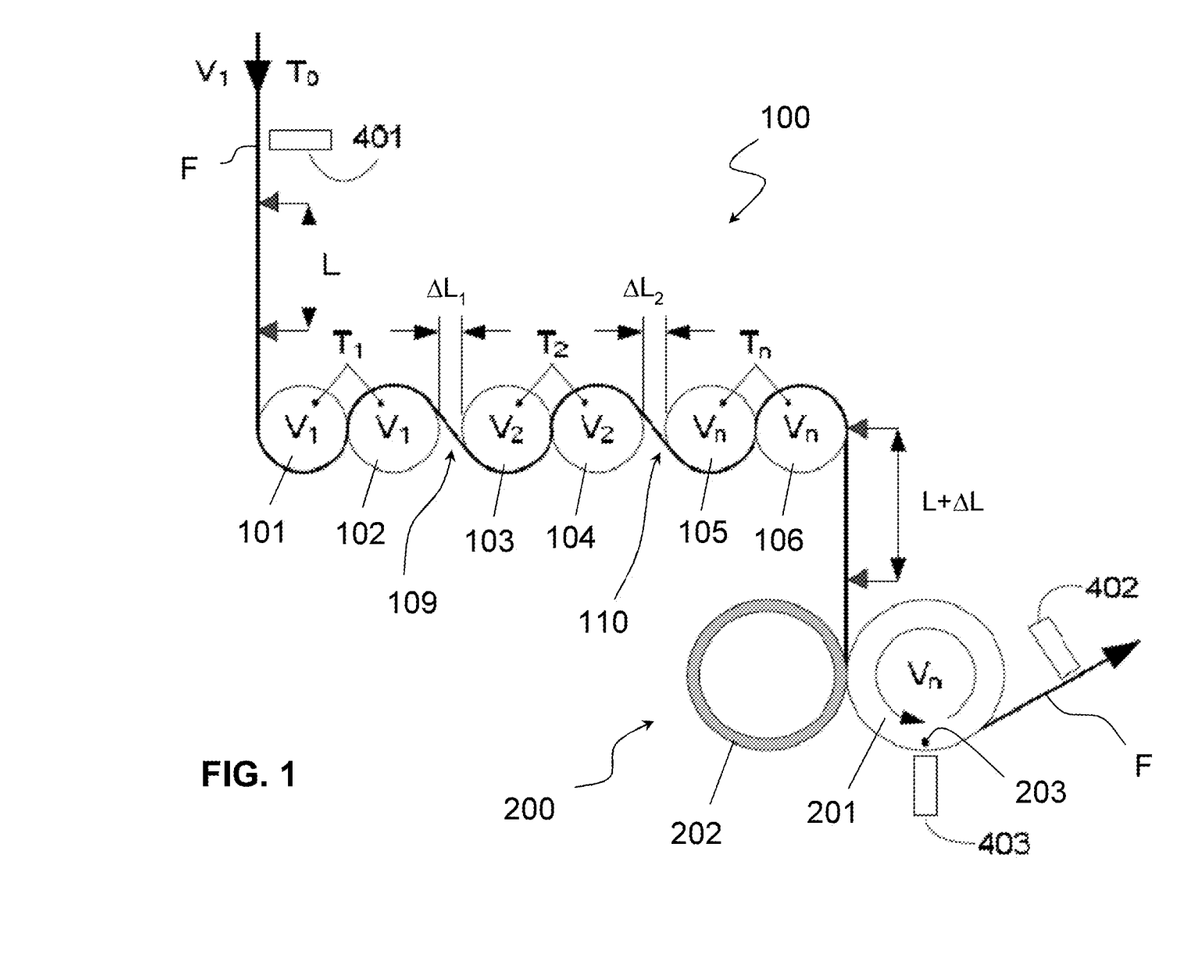
FIG. 1 shows a diagram of a continuous registered embossing process according to an embodiment of the invention. The figure schematically shows an apparatus for continuous embossing comprising an engraved cylinder and a pressing counter-cylinder.

FIG. 1 is a scheme of a process according to an embodiment of the invention in which an extensible film F passes through a pre-heating section 100 and then passes through an embossing section 200.

Figure 5:
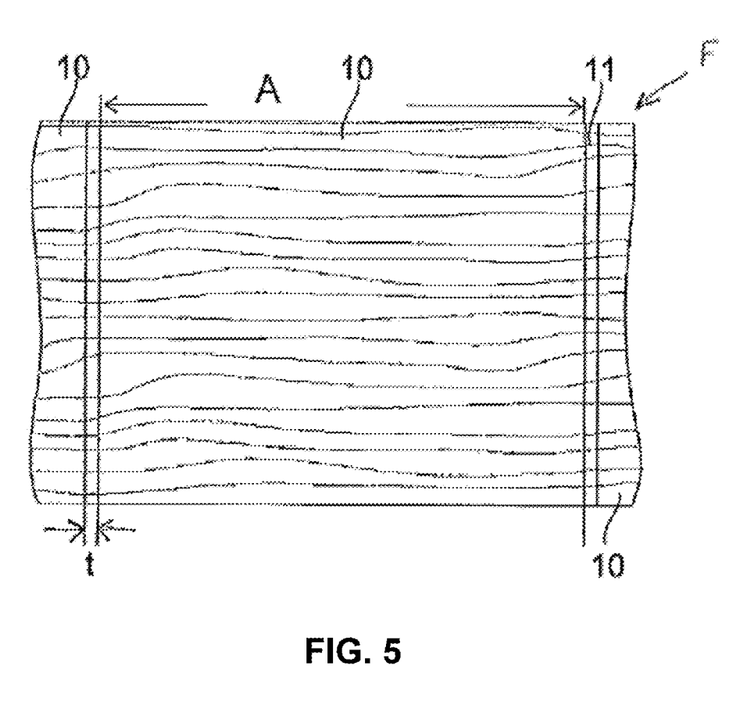
FIG. 5 shows an example of a film with a print that imitates wood, highlighting the printing pitch.

The film F can be made for example from PVC. Said film F carries a printed decoration that repeats with a printing pitch (also known as development) determined essentially by the diameter of a cylinder previously used for printing. For example FIG. 5 shows a wood-like decoration that repeats with a printing pitch A. The example indicates sections 10 of width equal to the pitch A, after each of which the pattern is repeated, and separated by joining portions 11, if intended for cutting like in the case of laminates produced for imitation wood flooring.

Going back to FIG. 1, the pre-heating section 100 includes a series of pre-heating cylinders. Preferably, the cylinders are arranged in pairs or groups. In the example six cylinders namely three pairs are depicted, indicated with reference numerals 101 to 106. The pre-heating cylinders 101-106 have a small diameter, more preferably about 150 mm. The symbols $V_1, \ldots V_n$ and $T_1, \ldots T_n$ denote the peripheral speeds and the temperatures of said cylinders.

The embossing section 200 essentially comprises an engraved embossing cylinder 201 and a counter-cylinder 202. The surface of the engraved cylinder 201 comprises suitable reliefs that, by contact, generate a "pattern" in relief on the surface of the suitably heated film F. The diameter of the cylinder 201, or rather its circumference, determines a pitch of the embossing. The counter-cylinder 202 is normally coated with rubber and is used to apply an embossing pressure. For example, said counter-cylinder 202 is connected to a hydraulic thrusting system, which can be made according to a known technique; said thrusting system is not essential for the purposes of embodiments of the present invention and it is not further described.

The film F is fed with a linear speed of advance motion $V_1$ and initial temperature $T_0$. The embossed film leaving the engraved cylinder 201 has a speed generally indicated with $V_n$ (corresponding to the peripheral speed of the cylinder 201) which is greater than $V_1$.

The film F comprises a series of reference marks generated during the printing process and readable by suitable sensors, typically by optical reading. In FIG. 1, the distance L denoted the distance between two contiguous reference marks, measured upstream of the pre-heating section 100, that is upstream of the first cylinder 101. Said distance L can be measured, for example, with a mark reader 401.

Said distance L in practice differs from the theoretical nominal distance between two marks (that is from the distance between the marks as generated in printing), being affected by an error (unknown) due to the causes that have been mentioned above and that include excessive tractions or shrinkage, over-heating, possible storage for a long time and/or at too high temperatures, etc.

The speeds and/or temperatures of the cylinders 101-106 are determined so that, while passing in the section 100, the film F undergoes a controlled elongation $\Delta L$. Through the effect of this controlled elongation (also termed stretching), the distance between the same two marks assumes a value $(L+\Delta L)$ downstream of the pre-heating section, and at the entry of the embossing section 200.

During the process, the extent of the elongation $\Delta L$ is controlled in such a way that said increased distance $(L+\Delta L)$ is constant and in synchrony with the engraved cylinder 201. In other words, the variable elongation $\Delta L$ "absorbs" the unknown deformation that initially affects the extensible film F, restoring the desired synchrony between the decoration already present on the printed film, and the embossing applied by the cylinder 201. More specifically, the distance $(L+\Delta L)$ between two marks is equal to the outer circumference of the cylinder 201, providing the contact with the film F, said condition being necessary to maintain the synchrony between embossing process and printed decoration.

Therefore, the controlled elongation $\Delta L$ is not constant but can be continuously adjusted by varying the speeds and the temperatures of the pre-heating cylinders. In a preferred embodiment, the extent of said elongation ΔL is calculated continuously with a feedback effect.

The stretching of the film F takes place mainly through the effect of one or more accelerations of the transportation speed of the film. Acceleration takes place when the film F passes from a slower cylinder to a faster cylinder, in terms of peripheral speed.

In the example of FIG. 1 the film F is conveyed to the section 100 with an initial linear speed $V_1$ and initial room temperature $T_0$ (not yet suitable for the stretching of the film). The cylinders 101 and 102, which form the first pair of cylinders, have a peripheral speed equal to said initial speed $V_1$ and therefore do not stretch the film, but they have a temperature $T_1$ that takes the film to a plastic state. The cylinders 103, 104 of the second pair, on the other hand, have a peripheral speed $V_2 > V_1$, so that the film F undergoes a stretching substantially in the short passage area 109 where it leaves the contact with the cylinder 102, and before adhering to the subsequent, faster cylinder 103. Said stretching coincides with a proportional decrease in thickness of the film, to respect the continuity of the material.

A second stretching, in an analogous way, takes place in the passage area 110 between the second pair of cylinders 103, 104 and the third pair of cylinders 105, 106, where the temperature of the film is further increased to $T_2$. Said third pair has a final peripheral speed $V_n$ that equals the output speed of the section 100 and the peripheral speed of the cylinder 201, at a temperature $T_n$ which suitable for embossing or, in another case (FIG. 3), for coupling with the substrate.

The closeness between the cylinders 102 and 103 (104 and 105, respectively) ensures that the film does not undergo a transversal necking (loss of width). Indeed, the film is particularly exposed to the undesired phenomenon of necking in the passage area, where it is "free" and not in contact with a cylinder; said area therefore is reduced to the essential minimum, bringing the said cylinders as close together as possible.

In this example, consequently, the desired elongation ΔL is the sum of two contributions or stretchings—a first stretching $\Delta L_1$ in the area 109 and a second stretching $\Delta L_2$ in the area 110, respectively. In other embodiments the number of said stretchings can be just one, or even greater than two. For example, in a simplified embodiment there is a group of cylinders with peripheral speed equal to the input speed $V_1$ and a second group with peripheral speed equal to the output speed $V_n$.

Each cylinder 101-106 or group of cylinders preferably has its own motors and/or transmission means and its own heating means, so that the cylinders (or groups) can have respective peripheral speeds $V_1, \ldots V_n$ and temperatures $T_1, \ldots T_n$ that are independent. A control system controls the speeds and temperatures of said cylinders or groups of cylinders.

It should be noted that in FIG. 1 the section 200 is distanced from the cylinder 106 for the sake of representation; in practice, the cylinders 202, 203 are preferably in the immediate vicinity of the exit of the pre-heating section, i.e. close to the cylinder 106, to avoid leaving a portion of film without contact and therefore consequent risk of loss of width.

The extent of the overall elongation ΔL to be applied to the film is calculated based on a measurement of the relative position of the engraved cylinder 201 with respect to the film F or, more precisely, with respect to the decoration printed on the film itself. Said measurement can be acquired with suitable readers.

The example of FIG. 1, for this purpose, shows: a first reader 401 upstream of the pre-heating section 100; a second reader 402 downstream of the embossing section 200; a third reader 403 located in the vicinity of the engraved cylinder 201.

The first reader 401 is arranged to detect the passage of the marks printed on the film F, and allows the measure of the distance L. The second reader 402 is arranged to detect an embossing impression generated by the cylinder 201 on the film. The third reader 403 is arranged to directly detect the position of the cylinder 201, reading a reference 203 fixedly connected to the cylinder itself, and is also used for the pre-registering operation when production is started and every time the printed film has a junction.

Preferably the readers 401 and 402 are optical readers; the reader 403 can be an optical reader as well, or possibly a magnetic reader sensitive to proximity passage of the reference 203.

Figures 2, 3:
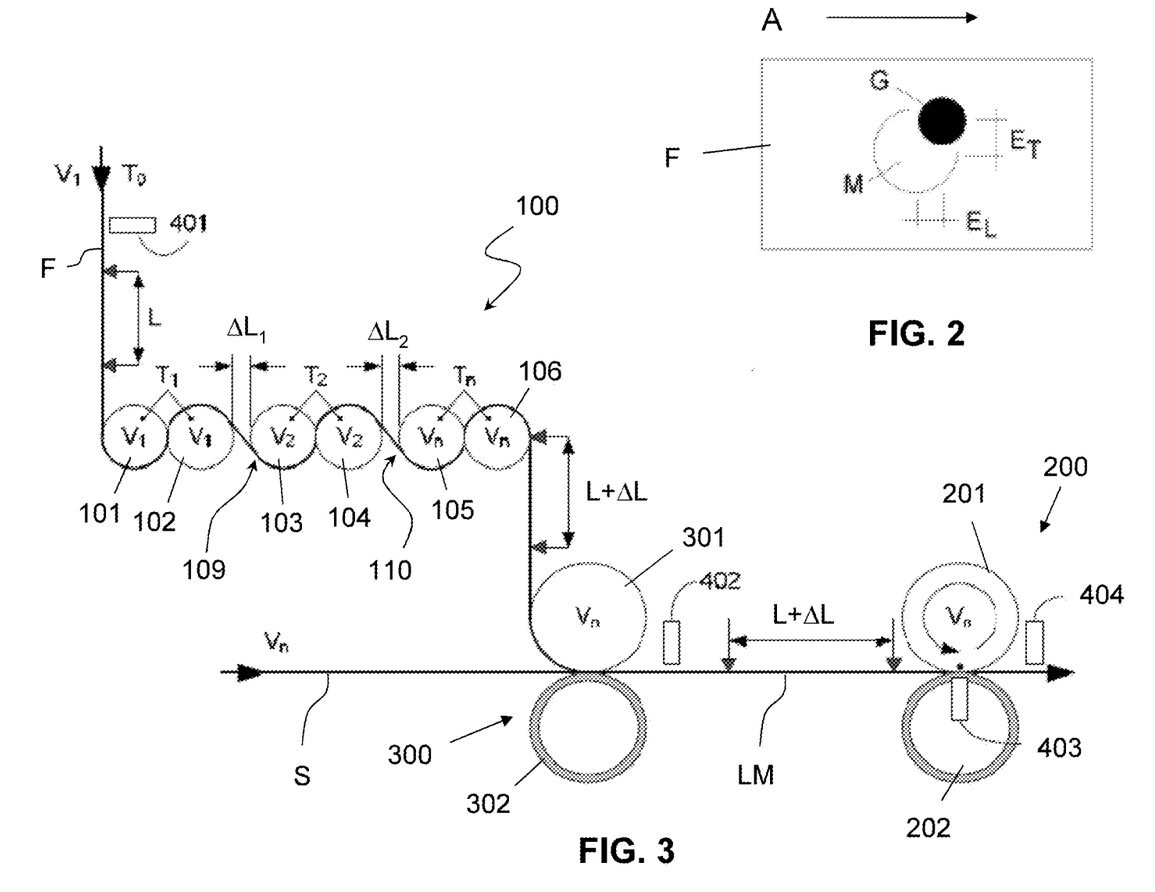
FIG. 2 schematically shows a positioning error of an embossing impression with respect to a printed mark, the detection of which is used to determine the controlled elongation of the film and/or a transversal centring.
FIG. 3 shows a diagram of a process according to another embodiment of the invention in which an extensible film is coupled with a substrate to form a laminate, subsequently embossed.

FIG. 2 schematically illustrates the regulation principle according to one of the embodiments of the invention. On a film F going from left to right according to the direction A, the figure shows a mark M printed on the extensible film and an embossing impression G generated by the cylinder 201. The mark M is first read by the reader 401 while the position of the impression G relative to the mark M is read by the reader 402. The example of FIG. 2 shows a positioning error of the impression G, corresponding to a synchrony error to be corrected. Said impression G is decentred with respect to the printed mark M by a longitudinal error $E_L$ and by a transversal error $E_T$; the longitudinal error $E_L$ can be corrected with an increase in the described controlled elongation (ΔL) of the film F; the error $E_T$ can be corrected by means of a transversal centring group (which is per se known and not illustrated) situated upstream of the pre-heating section 100.

FIG. 3 refers to a second embodiment of the invention, where the film F is coupled with a substrate S, obtaining a laminate product LM. The coupling between film and substrate takes place in a station 300 comprising two cylinders 301 and 302, upstream of the embossing section 200. Like in the previous case and for the sake of ease of representation, the station 300 is depicted distanced from the last pre-heating cylinder 106, but preferably the cylinder 301 is as close as possible to said last pre-heating cylinder.

The optical reader 402 in this second embodiment is situated downstream of the coupling cylinder 301. In other words, the centring measurement schematised in FIG. 2 is carried out immediately downstream of the coupling station 300.

It should be noted that the controlled elongation of the film is carried out before the coupling (upstream of the station 300) since after coupling with a fibreglass reinforced substrate S, the laminate becomes inextensible and the correction would no longer be possible. The laminate LM therefore is delivered to the embossing section 200 already in a registered state, apart from a fine correction that can be made by acting on the angular position of the cylinder 201.

In other words, the controlled stretching step is always carried out between the cylinders 101-106; the control step of the stretching is carried out at the exit of the coupling group 300 through the reader 402. This ensures that the reference marks (i.e. the printed decoration) has the correct pitch and position on a film that has become no longer extensible due to the coupling with an inextensible substrate.

After the subsequent embossing step, readers 403, 404 are associated with the embossing station 200. The cylinder 201 has an impression generator, accompanied by an optical reader 404 and by a mark reader 403 fixedly connected to the cylinder itself, to carry out a verification and fine registering, intervening to correct a longitudinal error $E_L$ with a variation of the described controlled elongation ($\Delta L$) of the film F, and/or an error $E_T$ by means of a transversal centring group (per se known, not illustrated) situated upstream of the pre-heating section 100. The mark reader 403 is also used for the pre-registering operation each time production starts and each time the printed film has a junction.

Figure 4:
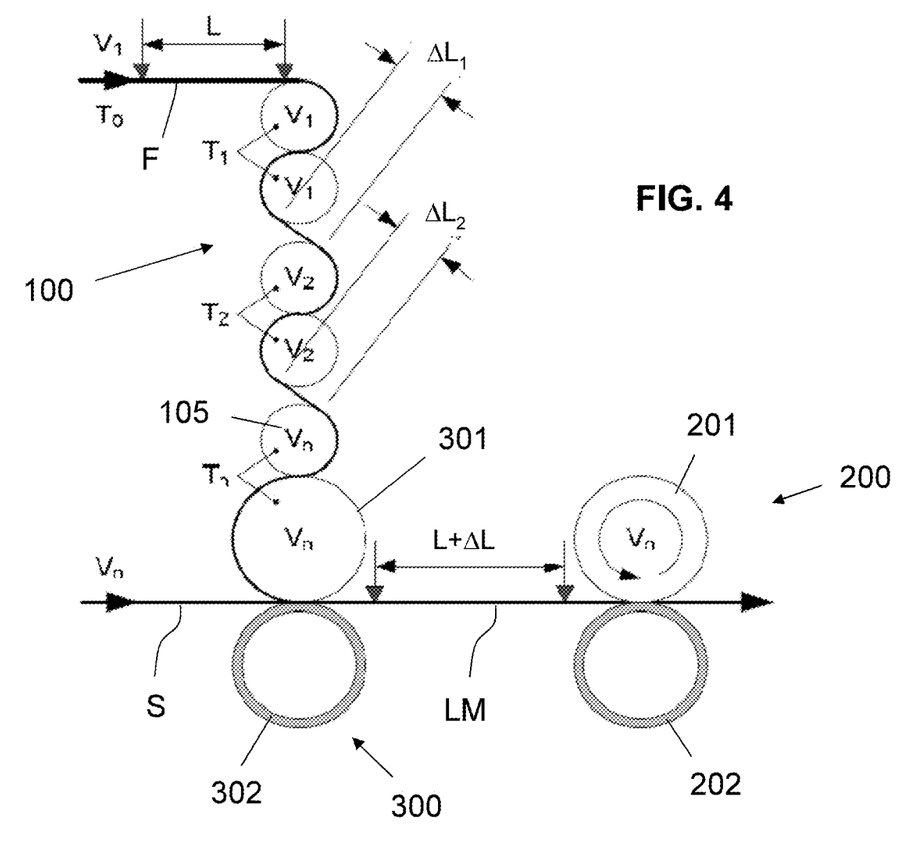
FIG. 4 shows another embodiment of the invention in which the last cylinder of the pre-heating step also represents the coupling cylinder between film and laminate.

FIG. 4 shows a variant in which the coupling cylinder 301 coincides with the last cylinder of the pre-heating section 100, i.e. it replaces the cylinder 106 of FIG. 1 and FIG. 3.

The invention claimed is:

1. A process for synchronized and continuous embossing of an extensible printed film or a laminate including an extensible printed film, wherein the extensible printed film is printed with a decoration having a pitch of repetition ("printing pitch"), and includes a plurality of reference marks printed on the extensible printed film, the process comprising:
    a first step of pre-heating the extensible printed film;
    embossing the extensible printed film by means of the action of at least one engraved rotary embossing cylinder;
    acquiring a measure which is directly or indirectly correlated to the angular position of the at least one engraved rotary embossing cylinder relative to at least one reference mark of the extensible printed film;
    while pre-heating a portion of the extensible printed film, subjecting the portion of the extensible printed film to a controlled elongation by passing the extensible printed film around at least two adjacent pairs of cylinders prior to the at least one engraved rotary embossing cylinder, the adjacent pairs of cylinders having different respective peripheral speeds, the extent of the controlled elongation being determined as a function of the measure, and such as to bring the decoration printed on the extensible printed film in registration with respect to the angular position of the at least one engraved rotary embossing cylinder;
    wherein the controlled elongation is obtained through a deformation of the portion of the extensible printed film in a longitudinal direction of advance motion of the extensible printed film, and the deformation of the portion of the extensible printed film having a substantially null component in the transversal direction substantially perpendicular to the longitudinal direction, so as to leave the width of the film unaltered; and
    wherein the embossing cylinder having an outer circumference for contact with the extensible printed film that is greater than the printing pitch of the extensible printed film.

2. The process according to claim 1 wherein the measure of the relative position between the extensible printed film and the at least one engraved rotary embossing cylinder comprises detection of the relative position between the at least one reference mark printed on the extensible printed film, and an impression generated by the at least one engraved rotary cylinder on the extensible printed film.

3. The process according to claim 2, further comprising at least one of:
    detecting the position of the at least one reference mark printed on the extensible printed film, carrying out the detection before the controlled elongation step;
    detecting an impression generated on the extensible printed film; or
    detecting the position of a reference associated directly with the at least one engraved rotary embossing cylinder.

4. The process according to claim 3 wherein at least one of the at least one reference mark on the extensible printed film, the position of the impression, or the position of the reference associated directly with the at least one engraved rotary embossing cylinder is detected by means of optical reading.

5. The process according to claim 1 wherein the adjacent pairs of cylinders include a first pair of pre-heating cylinders and a second pair of pre-heating cylinders, and the controlled elongation of the portion of the extensible printed film is caused by at least a stretching of the portion of the extensible printed film during the passage from the first pair of pre-heating cylinders, having a first peripheral speed, to the second pair of pre-heating cylinders, having a second peripheral speed greater than the first speed.

6. The process according to claim 5 wherein the controlled elongation is also caused by a change of temperature between the first pair of pre-heating cylinders and the second pair of pre-heating cylinders, the first and the second pairs of pre-heating cylinders having a temperature higher than room temperature and such as to take the portion of the extensible printed film to a plastic state.

7. The process according to claim 1 wherein the embossing is carried out directly on the extensible printed film, obtaining a printed and embossed extensible printed film.

8. The process according to claim 1, further comprising coupling the pre-heated printed film with a substrate, thereby producing a laminate.

9. The process according to claim 8 wherein the embossing is carried out on a laminate comprising the extensible printed film coupled with the substrate.

10. The process according to claim 8 wherein the measure of the relative position between the extensible printed film and the at least one engraved rotary embossing cylinder comprises detection of the relative position between the at least one reference mark printed on the extensible printed film, and an impression generated by the at least one engraved rotary embossing cylinder on the laminate comprising the extensible printed film.

11. The process according to claim 10, further comprising at least one of:
    detecting the position of the at least one reference mark printed on the extensible printed film, carrying out the detection before the controlled elongation step;
    detecting an impression generated on the laminate; or
    detecting the position of a reference associated directly with the at least one engraved rotary embossing cylinder.

12. An apparatus for embossing an extensible printed film or a laminate including an extensible printed film, the apparatus comprising:
    a section for pre-heating the extensible printed film;
    a section for embossing the extensible printed film the section comprising at least one engraved rotary embossing cylinder, the section for embossing the extensible printed film being downstream of the section for pre-heating;
    measuring means arranged to acquire a measure correlated directly or indirectly with the angular position of the embossing cylinder relative to at least one reference mark printed on the extensible printed film; and means for stretching the extensible printed film disposed in the section for pre-heating the extensible printed film, as the extensible printed film is pre-heated, and control means associated with the stretching means, arranged to subject the extensible printed film to a controlled elongation during pre-heating, and the extent of the controlled elongation being determined by the control means as a function of the measurement, with the effect of registering the position of the decoration printed on the extensible printed film with respect to the embossing cylinder;

wherein the stretching means is located upstream from the section for embossing and the at least one engraved rotary embossing cylinder, the stretching means includes adjacent pairs of cylinders, and the stretching means is suitable for applying a purely longitudinal deformation of the extensible printed film, in the direction of forward motion of the extensible printed film itself, and with a substantially null component in the transversal direction, so as to leave the width of the extensible printed film unaltered during stretching; and wherein the at least one engraved rotary embossing cylinder has an outer circumference of contact with the extensible printed film, which is greater than the printing pitch of the extensible printed film.

13. The apparatus according to claim 12 wherein the measuring means comprise at least one of the following: a sensor arranged upstream of the pre-heating section, and configured to detect the passage of reference marks printed on the extensible printed film; a sensor arranged to detect the position of a reference directly associated with the at least one engraved rotary embossing cylinder; or a sensor arranged to detect the passage of an impression generated by the embossing cylinder on the extensible printed film.

14. The apparatus according to claim 12 wherein the adjacent pairs of cylinders of the means for stretching the extensible printed film comprise at least a first pair of pre-heating cylinders, during use having a first peripheral speed, and a second pair of pre-heating cylinders, during operation having a second peripheral speed greater than the first speed, so that the extensible printed film undergoes a longitudinal stretching during the passage from the first pair of pre-heating cylinders to the second pair of pre-heating cylinders.

15. The apparatus according to claim 14 wherein the first and the second pairs of pre-heating cylinders, have different temperatures during operation.

16. The apparatus according to claim 12, further comprising a coupling section for coupling the pre-heated extensible printed film with a substrate obtaining a laminate, the coupling section being downstream of the pre-heating section.

17. The apparatus according to claim 16 wherein the at least one engraved rotary embossing cylinder has an outer circumference in contact with the laminate, which is greater than the printing pitch of the extensible printed film.

18. The apparatus according to claim 16 wherein the measuring means comprises a sensor arranged to detect the passage of an impression generated by the at least one engraved rotary embossing cylinder on the laminate.

* * * * *